United States Patent
Neilson et al.

(10) Patent No.: US 9,917,737 B2
(45) Date of Patent: Mar. 13, 2018

(54) SYSTEMS AND METHODS FOR PROGRAMMABLE DEVICE INSTALLATIONS

(71) Applicant: SCHNEIDER ELECTRIC USA INC., Palatine, IL (US)

(72) Inventors: Stuart John Neilson, Brentwood (CA); Robert Lee, Victoria (CA)

(73) Assignee: SCHNEIDER ELECTRIC USA, INC., Andover, MA (US)

(*) Notice: Subject to any disclaimer, the term of this patent is extended or adjusted under 35 U.S.C. 154(b) by 61 days.

(21) Appl. No.: 14/588,062

(22) Filed: Dec. 31, 2014

(65) Prior Publication Data

US 2016/0191318 A1 Jun. 30, 2016

(51) Int. Cl.
| | |
|---|---|
| H04L 12/24 | (2006.01) |
| G06F 9/44 | (2006.01) |
| G06F 11/00 | (2006.01) |
| H04L 29/08 | (2006.01) |

(52) U.S. Cl.
CPC ............ *H04L 41/0869* (2013.01); *G06F 8/00* (2013.01); *G06F 11/00* (2013.01); *H04L 41/0883* (2013.01); *H04L 41/24* (2013.01); *H04L 41/0889* (2013.01); *H04L 67/34* (2013.01); *Y04S 40/162* (2013.01)

(58) Field of Classification Search
None
See application file for complete search history.

(56) References Cited

U.S. PATENT DOCUMENTS

| | | | | |
|---|---|---|---|---|
| 6,477,245 | B1* | 11/2002 | Chevet | H04Q 3/545 |
| | | | | 379/201.03 |
| 7,555,421 | B1 | 6/2009 | Beckett et al. | |
| 8,051,156 | B1* | 11/2011 | Sharma | G06F 9/5094 |
| | | | | 700/276 |
| 8,838,973 | B1* | 9/2014 | Yung | H04L 63/1483 |
| | | | | 713/165 |
| 8,914,039 | B1* | 12/2014 | Sheikh | G06Q 30/0205 |
| | | | | 455/414.1 |
| 2005/0027831 | A1* | 2/2005 | Anderson | G06F 8/63 |
| | | | | 709/220 |
| 2006/0208088 | A1* | 9/2006 | Sekiguchi | G06K 7/1095 |
| | | | | 235/472.02 |
| 2008/0297847 | A1* | 12/2008 | Yamazaki | G06F 17/50 |
| | | | | 358/1.15 |

(Continued)

OTHER PUBLICATIONS

Notification of Transmittal of the International Search Report and the Written Opinion of the International Searching Authority from corresponding PCT/US2015/067589 dated Mar. 3, 2016.

*Primary Examiner* — Ninos Donabed
(74) *Attorney, Agent, or Firm* — Lando & Anastasi, LLP

(57) ABSTRACT

According to at least one embodiment, a system including a server is provided. The server includes a memory and at least one processor coupled to the memory. The at least one processor is configured to receive configuration information encoded in a QR code, the configuration information being based on one or more values of one or more configuration options for at least one programmable device. The at least one processor is also configured to determine if the configuration information is in accord with target configuration information and transmit a message indicating whether the configuration information is in accord with the target configuration information.

15 Claims, 9 Drawing Sheets

(56) References Cited

U.S. PATENT DOCUMENTS

| | | | |
|---|---|---|---|
| 2009/0077478 A1* | 3/2009 | Gillingham | H04L 41/0803 715/763 |
| 2010/0161878 A1* | 6/2010 | Chang | G06F 21/79 711/103 |
| 2013/0067301 A1* | 3/2013 | Suzuki | G06F 17/30879 715/201 |
| 2013/0080289 A1* | 3/2013 | Roy | G06Q 30/06 705/26.8 |
| 2013/0173754 A1* | 7/2013 | Van Os | H04L 67/02 709/219 |
| 2013/0211939 A1* | 8/2013 | Katira | G06Q 30/0641 705/26.1 |
| 2013/0223279 A1* | 8/2013 | Tinnakornsrisuphap | H04L 41/0809 370/254 |
| 2013/0299571 A1* | 11/2013 | Metso | G06F 17/30 235/375 |
| 2013/0318155 A1* | 11/2013 | Ichikawa | H04L 67/02 709/203 |
| 2014/0107976 A1* | 4/2014 | Kallfelz | H01M 10/4285 702/182 |
| 2014/0108943 A1* | 4/2014 | Lee | G06F 3/04817 715/738 |
| 2014/0112463 A1* | 4/2014 | Ghesquiere | H04M 1/274516 379/142.04 |
| 2014/0237463 A1 | 8/2014 | Sriram et al. | |
| 2014/0282991 A1* | 9/2014 | Watanabe | G06F 21/34 726/9 |
| 2014/0330949 A1* | 11/2014 | Thompson | H04L 41/0816 709/221 |
| 2014/0374475 A1* | 12/2014 | Kallfelz | H04Q 9/00 235/375 |

* cited by examiner

SYSTEMS AND METHODS FOR PROGRAMMABLE DEVICE INSTALLATIONS

BACKGROUND

Technical Field

The technical field relates generally to installation and configuration of programmable devices and, more particular, to methods and systems of error-checking installations of programmable devices.

Discussion

Currently, when an electrician installs and configures a programmable device such as a meter, the electrician is required to make sure that all of the configuration options for the programmable device are correct. Each device may also have different configuration options that vary based on location and function, so it is common for configuration mistakes to occur while an electrician is setting a device's configuration. Any mistakes in configuration may not be observed until the system including the programmable device is activated.

SUMMARY

According to at least one embodiment, a system including a server is provided. The server includes a memory and at least one processor coupled to the memory. The at least one processor is configured to receive configuration information encoded in a QR code, the configuration information being based on one or more values of one or more configuration options for at least one programmable device. The at least one processor is also configured to determine if the configuration information is in accord with target configuration information and transmit a message indicating whether the configuration information is in accord with the target configuration information.

In the system, the server may include a device list of programmable devices, the list including at least one of a programmable device's serial number, a programmable device's configuration parameters, and a programmable device's intended usage. The system may further include the at least one programmable device. The at least one programmable device may be further configured to generate the configuration information; encode the configuration information into the QR code; and display the QR code with the encoded configuration information.

In the system, the server may include third party information relating to locked registers of the at least one programmable device and factory values of the at least one programmable device. The server may not be directly connected to the at least one programmable device.

The system may further include a local server comprising a memory including target configuration information relating to a plurality of programmable devices and at least one processor configured to emulate the at least one programmable device using the target configuration information; receive the configuration information encoded in the QR code; detect whether the communication information is in accord with the target configuration information; and send a message to the server indicating whether the communication information is in accord with the target communication information.

In the system, the server may be further configured to generate a recommendation in response to determining that the configuration information is not in accord with the target configuration information and send the recommendation to a smart device. The system may further include the smart device. The smart device may be configured to scan the QR code; send the QR code to the server; receive the recommendation; and display the recommendation.

In the system, the server may be further configured to generate configuration instructions to configure the at least one programmable device. The server may include diagnostic software to determine the target configuration information. In the system, at least one processor may be further configured to receive a serial number of the at least one device; and generate installation instructions for the at least one device.

According to another embodiment, a system including at least one programmable device is provided. The system includes a memory and at least one processor coupled to the memory. The at least one processor is configured to generate configuration information, the configuration information based on one or more values of one or more configuration options; encode the configuration information into a QR code; and display the QR code including a representation of the configuration information.

The system may further include a smart device configured to scan the QR code; update information relating to the at least one programmable device using the QR code; send the QR code to a server; receive a recommendation; and display the recommendation. The system may further include the server. The server may be configured to receive the QR code storing the configuration information; determine if the configuration information is in accord with target configuration information; generate a recommendation in response to determining that the configuration information is not in accord with the target configuration information; and send the recommendation to the smart device. In the system, the at least one programmable device may not be connected to the server.

According to another embodiment, a method for verifying a configuration is provided. The method comprising acts of receiving configuration information encoded in a QR code, the configuration information based on one or more values of one or more configuration options for at least one programmable device; determining if the configuration information is in accord with target configuration information; and transmitting a message indicating whether the configuration information is in accord with the target configuration information.

The method may further include acts of generating a recommendation in response to determining that the configuration information is not in accord with the target configuration information; sending the recommendation to a smart device; and displaying, by the smart device, the recommendation. The method may further include acts of receiving, by at least one programmable device, the configuration information; encoding, by the at least one programmable device, the configuration information into a QR code; displaying, on a display of the at least one programmable device, the QR code including the encoded configuration information; scanning, by a smart device, the QR code; and sending, by the smart device, the configuration information.

The method may further include acts of scanning, by the smart device, a serial number of the at least one programmable device; sending, by the smart device, the serial number to the server; generating, by the server, instructions for installing the at least one programmable device; and sending, by the server to the smart device, the instructions. In the method, the act of determining if the configuration information is in accord with the target configuration information may include an act of pushing the configuration information to a virtualized programmable device and receiving either a successful communication message or an error message.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example or embodiment disclosed herein may be combined with any other example or embodiment. References to "an example," "an embodiment," "some examples," "some embodiments," "an alternate example," "various embodiments," "one example," "at least one embodiment," "this and other examples" or the like are not necessarily mutually exclusive and are intended to indicate that a particular feature, structure, or characteristic described in connection with the example or embodiment may be included in at least one example or embodiment. The appearances of such terms herein are not necessarily all referring to the same example or embodiment. Furthermore, in the event of inconsistent usages of terms between this document and documents incorporated herein by reference, the term usage in the incorporated references is supplementary to that of this document; for irreconcilable inconsistencies, the term usage in this document controls.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
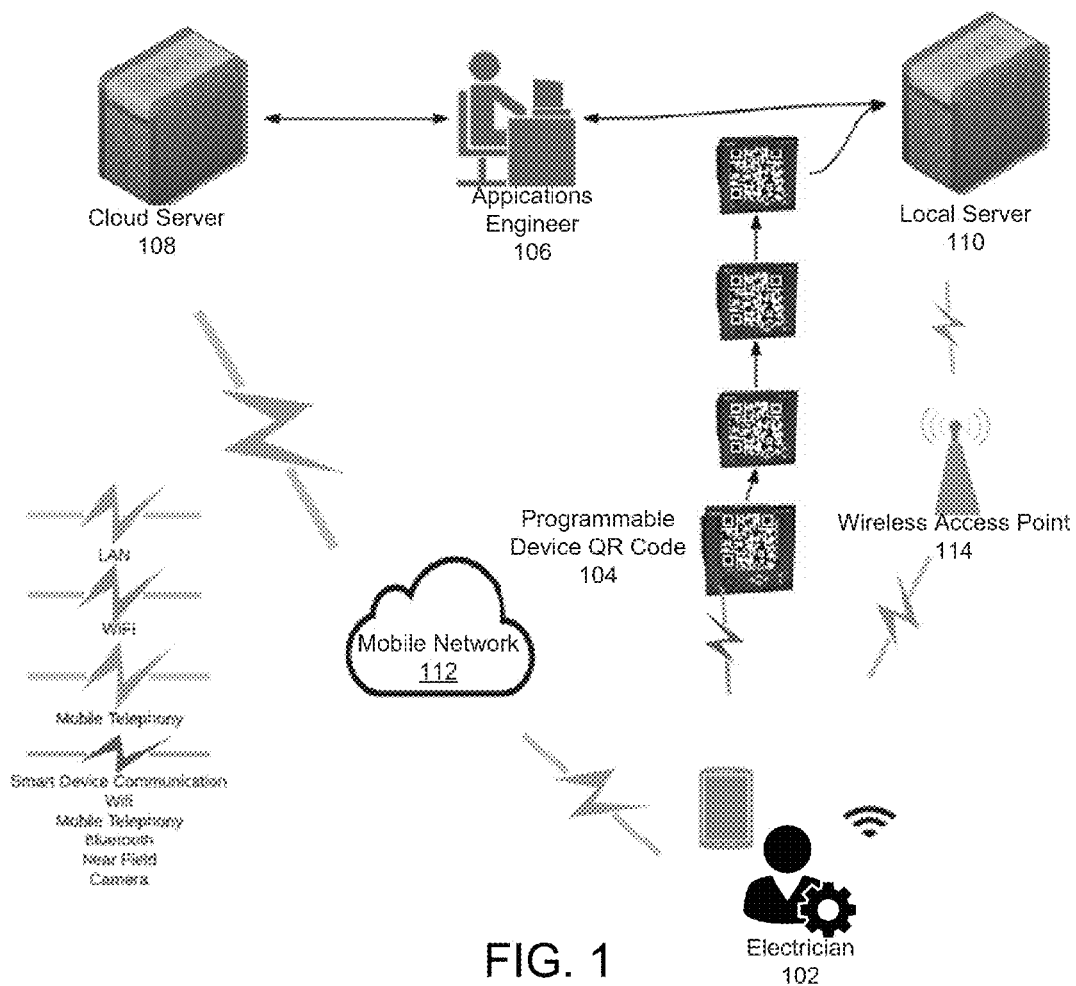
FIG. 1 is a communication diagram illustrating device interactions, according to one embodiment.

Aspects and embodiments disclosed herein provide processes and apparatus for validating the configuration and installation of a programmable device. There exists a need to streamline the process of error-checking the installation of a programmable device such that the programmable device is readily configured by the time an applications engineer initializes the programmable device. According to one example, a programmable device, upon being installed and configured, communicates configuration information. The configuration information may be communicated via, for example, a displayed QR code representative of the configuration information. A QR code scanner such as, for example, a camera on a smart device may scan the QR code and return various feedback information relating to the installation and configuration of the programmable device.

According to some examples, the programmable device may be an intelligent electronic device, a meter, a relay device, a controller, a switch, a voltage regulator, a computer, a transformer, a circuit breaker, or any other device including a microprocessor. The programmable device may be further configured to provide an interface such as a display through which a user can input information. According to some aspects, the programmable device is configured to display a QR code that contains encoded configuration information relating to the device. The encoded information may be sent to a cloud computing server. The cloud computing server may be configured to receive the encoded information and calculate if the device is configured correctly. The cloud computing server may also generate a recommendation to provide a user with information to correct an error in the device configuration. The programmable device may be able to display various screens including graphical user interfaces, settings, and videos.

According to some aspects, the programmable device may not be able to directly communicate with the cloud computing server. According to these aspects, the programmable device may use near field communication (NFC), Bluetooth communication, QR code transferral, or other communication methodologies to communicate the configuration information to a smart device or encrypted application that acts as an intermediary between the cloud computing server and the programmable device. The programmable device may wirelessly communicate information to the smart device or the encrypted application such that an electrician can quickly view any errors in the configuration after installing a programmable device.

In some examples, a serial number of a programmable device is scanned and sent to the cloud computing server. The cloud computing server responds to a received serial number by sending correct configuration and installation information for the programmable device to an electrician's smart device. The correct configuration and installation information may include values of configuration options, including instructions for configuring hardware and software of the programmable device. The correct configuration and installation information, if followed correctly, may cause the programmable device to be configured according to target configuration information stored in the cloud computing server. In response to the received correct configuration and installation information, the smart device may, for example, display installation directions and values via an application. If there is a communication error, the smart device may display a message indicating the error. Once the programmable device is configured, it may display a QR code with encoded configuration information for the programmable device. The smart device can scan the QR code and send the QR code or the encoded information from the QR code to a cloud computing server. The cloud computing server may compare the received encoded information with the target configuration information to detect any installation errors.

According to one example, the cloud computing server may also update as more programmable devices are installed. For example, if three programmable devices are to be installed in the same location, the cloud computing server may receive the serial numbers of the three programmable device and a location (e.g., a location ID) and provide specific instructions on the order and configuration, both software and hardware, of the installation of the three programmable devices. If an error occurs during the installation, after receiving a QR code, the cloud computing server may relay a success or failure message to, for example, the smart device of a user. According to some embodiments, the cloud computing server uses an emulated programmable device to test the configuration information and detect errors. The cloud computing server may analyze record information descriptive of electrical and communication network topology, as well as information from previous installations, to determine a correct configuration. The cloud computing server may have information relating to thousands of various programmable device installations, including installations with multiple programmable devices in one location and multiple programmable devices connected to one another through various network structures. The cloud computing server may use all of the relevant stored information including information relating to the specific programmable devices (e.g., received by programmable device serial numbers) to create information for target configuration instructions. The cloud computing server may also gain additional knowledge from user responses to configuration prompts to streamline future prompts. For example, an application on a smart device may incorporate a timer to count how long a user takes to read each prompt in a set of instructions. If a user, for example, clicks on an input to skip the prompts multiple times, the cloud computing server may stop displaying the prompts to the user. This way, the prompts may be reduced to streamline the installation process.

Further, according to some aspects, the instructions from the cloud computing server may have a manual override option. If a user (e.g., an electrician) disagrees with an instruction, the user may input alternate information along with an optional reason for the change. This way, the cloud computing server may receive the updated information and display both options the next time a there is a similar installation. Eventually, the option that is chosen consecutively by multiple users may be incorporated into the default instructions that are displayed.

In another example, three programmable devices are to be installed and two of the devices require a voltage mode of 120 volts, while the third device requires a voltage mode of 240 volts. If an electrician configures two of the devices incorrectly by mixing up the voltage modes, the cloud computing server may be able to detect the configuration error from the QR code and send a message indicating that the voltage mode on device A and the voltage mode on device B are reversed. The cloud computing server may detect the configuration error by comparing the received configuration information to the configuration information in the emulated device to find a mismatch.

According to some aspects, a local server may be used to store easily accessible information relating to all of the programmable devices. The local server may be, for example, a Power Monitoring Expert (PME). The cloud computing server and the local server may host all of the configuration information for the programmable devices. The local server may also connect with each programmable device via bi-directional communication using, for example, wireless communication networks. The cloud computing server may also receive a device configuration from a smart device via a QR code on a programmable device and then push that device configuration to the local server. The wireless communication networks may include public networks, such as the internet, and may include other public or private networks such as LANs, WANs, extranets, intranets, and cloud computing systems. The wireless communication network may also include cellular networks such as CMDA, EvDO, GSM, and iDEN networks. Examples of configuration information include current transformer (CT) ratios, potential transformer (PT) ratios, power system types, serial port settings, device IDs, Ethernet connections, location ID, serial number, device group ID, and others.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Configuration Confirmation System

Various embodiments utilize programmable devices and computer systems in a cloud computing server to receive and analyze configuration information relating to a newly configured programmable device to determine if there are any configuration or installation errors. FIG. 1 illustrates one example of communications between an electrician 102, a cloud computing server 108, a local server 110, programmable device QR codes 104, and an applications engineer 106. The communications may be via LAN, Wi-Fi, Mobile telephone, smart device communication, Bluetooth, near field communication (NFC), or any other type of communication. Further, the communication methods used between devices and users in FIG. 1 may be interchanged.

Figure 2:
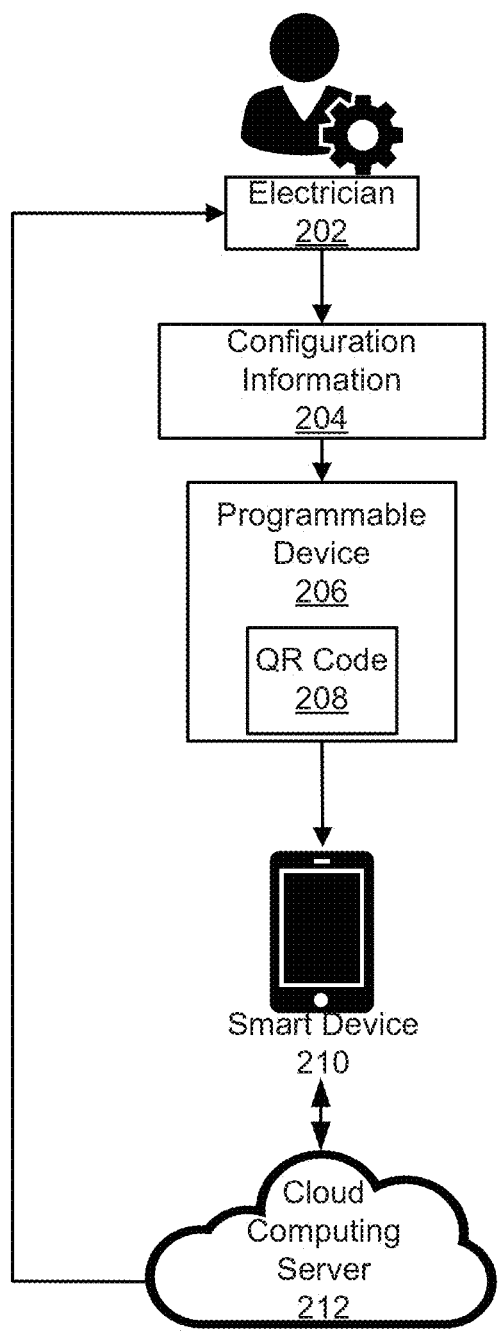
FIG. 2 is a diagram of an example programmable device testing method, according to one embodiment.
Figure 3:
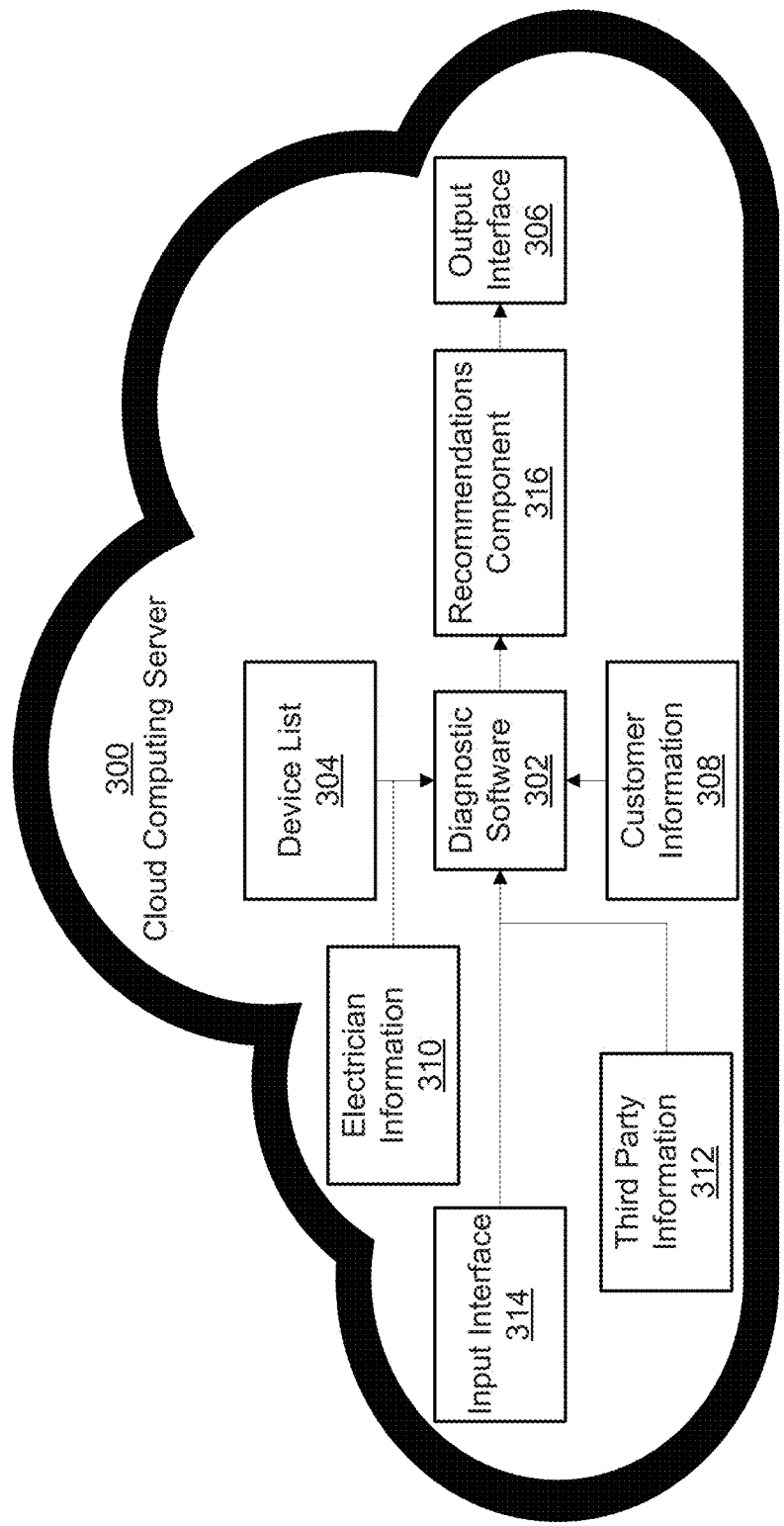
FIG. 3 is a block diagram of an example cloud computing server, according to one embodiment.

According to some aspects, an electrician 102 installs and configures a programmable device. Once installed and configured, the programmable device generates and displays a QR code encoding all of the related configuration information. An application on a smart device may scan the QR code to receive all of the programmable device information, including updated installation and configuration information from the programmable device. Once the electrician scans the QR code using a smart device and the smart device receives the configuration information, the smart device may transmit the configuration information to a cloud computing server 108. The cloud computing server 108 may be, for example, a Schneider Electric Cloud Virtual Service. An example embodiment of a cloud computing server is illustrated in FIG. 3. The cloud computing server generates a recommendation to fix or update a configuration and may send the recommendation to a device associated with the electrician 102 or an applications engineer 106. The recommendation may be generated by comparing output values using the received configuration information and comparing the output values to the target output values. The target output values may be generated by an emulated programmable device in local server 110 or from information received from previous installations of a similar device. In some examples, a local server is not necessary, as illustrated in FIG. 2.

According to some examples, the local server 110 is configured to communicate with the cloud computing server 108 directly via, for example, internet communications. The cloud computing server may also include configuration information for the local server. According to some examples, the local server 110 may be used to test programmable device configurations. For example, the cloud computing server 108 may push programmable device configurations to the local server 110. The ability to push configuration information to the local server 110 allows for expedited commissioning or troubleshooting at a later date.

In some examples where the local server 110 is a PME within an established installation, the local server 110 is configured to receive and store configuration information for one or more programmable devices (e.g., the programmable device 206 described below with reference to FIG. 2) to be added to the installation. When executing according to this configuration, the local server 110 may provide a user interface through which the local server 110 receives input from the application engineers 106. This input may be indicative of the configuration information for the one or more programmable devices to be added to the installation. In response to receiving the input, the local server 110 stores the configuration information a data store. In this way, the application engineers 106 may pre-configure programmable devices prior to their deployment within an existing installation.

In some of these examples, the electrician 102 subsequently installs the one or more programmable devices and scans the QR codes displayed by the one or more programmable devices using a smart device. In these examples, the smart device transmits the configuration information represented in the QR code (e.g., transmits the QR code itself) to the cloud server 108. In response to receiving the configuration information, the cloud server 108 transmits a notification to the local server 110 indicating that the one or more programmable devices are installed and at least partially operational (e.g., able to receive communications from the local server 110). In response to receiving the notification, the local server 110 may check-on and establish communications with the one or more programmable devices and fully configure them with the stored, pre-configured configuration information.

According to some aspects, the cloud computing server 108 can test communications based on information in the local server 110. For example, if an electrician wrongly inputs an IP address for a programmable device, the cloud computing server 108 can attempt to communicate with (e.g., ping) an emulated or a virtualized installation of the programmable device in the local server 110. If the communication fails, the cloud computing server 108 can send the electrician a notification of a failed communication, indicating a recommendation, for example, to check the IP address.

Further, according to one example, if a local server 110 will be installed after a set of programmable devices, the cloud computing server 108 may emulate a local server installation with emulated configuration information for the local server 110.

According to one embodiment, a smart device may include a list or a diagram (e.g., a one-line diagram) of all of the programmable devices. The smart device may display each programmable device with corresponding device information (e.g., configuration information). The smart device may also receive input requesting an update of device information (e.g., by scanning QR code 104). Once device information is updated and sent to the cloud computing server 108, the information may be sent to the local server 110 from the cloud computing server 108.

In some embodiments, each programmable device has a corresponding local server 110. The local server's address information may be received by the programmable device upon installation. According to this embodiment, if the local server address information is incorrect on the programmable device, the cloud computing server may send feedback and recommended adjustments to the programmable device (e.g., fixing the IP address of the associated local server).

According to further examples, the local server 110 may store configuration information relating to each of the programmable devices. An applications engineer 106 may update the information in the cloud computing server 108, and then test the updated configuration information for each programmable device by using the local server 110. Further, if a programmable device is logged into after installation, the cloud computing server 108 or the local server 110 may provide an alert to a user (e.g., electrician 102) when the configuration has been changed since the last time the user logged in to the device. The notification may be sent directly the user's smart device.

FIG. 2 illustrates one example of interactions between an electrician 202, a programmable device 206, a smart device 210, and a cloud computing server 212. The programmable device 206 may include any device with configurable operations, such as the programmable device described below with reference to FIG. 4. The smart device 210 may include a mobile computing device such as a laptop computer, tablet computer, cellular phone (e.g., smart phone), personal digital assistant, or any other portable device configured to telecommunicate with other devices.

According to one embodiment, the electrician 202 inputs configuration information 204 into a programmable device 206. The configuration information may be received by the programmable device via a keyboard, a touch screen, or any other method of entering information into a device. According to some aspects, the electrician 202 may open up the programmable device 206 to configure wires and various other hardware. The configuration information and installation instructions may be provided by a programmable device installation company based on the location and type of the programmable device. In other examples, the cloud computing server may send the installation and configuration instructions to the electrician 202 to input into the programmable device 208.

According to some aspects, once the programmable device is installed, the programmable device may navigate to a confirmation screen that displays a QR code. The QR code may be generated by the programmable device 206 and include encoded configuration information. A smart device 210 may scan the QR code and transfer the QR code or the encoded information from the QR code to the cloud computing server 212 via a network. According to some embodiments, the smart device scans the QR code within an application that is configured to automatically send the QR code to the cloud computing device, wait, and then display all of the information relating to the configuration of the programmable device 206, including any errors in, for example, configuration or communication.

According to some examples, before receiving configuration information, the smart device 210 scans a serial code of the programmable device 206 to identify the programmable device 206. The smart device 210 identifies the programmable device 206 by sending the serial number to the cloud computing server 212 and receiving identification information. Once received, the smart device displays the most recent installation or configuration information in the programmable device 206. After scanning the QR code, the smart device refreshes to display the new configuration information 204 encoded within the QR code.

Once the smart device 210 scans the QR code 208, the configuration information 204 that has been entered into the programmable device 206 is transmitted to the cloud computing server 212. An example of one embodiment of the cloud computing server 212 is shown in FIG. 3. The cloud computing server takes the configuration information 204 and compares the information with the recommended and correct configuration information of the device. If the configuration information in the programmable device 206 matches the recommended configuration information in the cloud computing server 212, the cloud computing server returns a message indicating a correct configuration. If the configurations do not match, the cloud computing server 212 displays a message to the electrician 202 via, for example, the smart device 210 indicating the error and a recommendation on what to change or fix. According to some examples, the cloud computing server may send an email, text, call, or any other form of a message to the electrician and optionally any other users of the programmable device 210 about the error and how to fix the error.

Cloud Computing Server

As discussed above with regard to FIG. 1 and FIG. 2, various aspects and functions described herein may be implemented as specialized hardware or software components executing in a cloud computing server. The cloud computing server may consist of memory and processors configured to analyze information and store information in databases.

As shown in FIG. 3, the cloud computing server 300 comprises an input interface 314 to receive configuration information and device information (e.g., serial numbers) and diagnostic software 302 to perform various calculations and analysis of received configuration information. The diagnostic software may receive a device list including device serial numbers and target configuration information, electrician information 310, third party information 312, and customer information 308. The diagnostic software 302 may update the target configuration information and compare the received configuration information to the target configuration information. The recommendations component 316 may generate a recommendation based on the outputs and comparisons from the diagnostic software 302. The output interface 306 may send the recommendation to a smart device. The cloud computing server may also display information in, for example, a web browser or a mobile application.

According to some aspects, the device list 304 may be held in a database along with other sections storing customer information 308, electrician information 310, and third party information 312. The device list may include any information relating to any of the devices, including serial numbers, configuration parameters, communication setup, intended usage for devices, and others. Third party information 312 may include knowledge of locked registers and preset factory values relating to each programmable device. Third party information 312 may also include information provided by the sealing house of a programmable device. The third party information may be used in the installation, configuration, and commissioning of a secure programmable device, such as, for example, a revenue sealed meter. The electrician information 310 and the customer information 308 may include contact information that is used by the output information to send messages relating to the status of programmable devices. The cloud computing server 300 may be configured to store a plurality of QR codes that may be displayed to a user relating to each of a plurality of programmable devices. For example, a user can check off multiple programmable devices and the cloud computing server 300, using information relating to each programmable device stored in a database, can calculate and display a status of the programmable devices based on the last communication with the programmable devices.

According to one example, a programmable device may be directly connected with a cloud computing server 300. The programmable device may be configured to update the information held in the cloud computing server every period of time, and the cloud computing server may be configured to send a message to an electrician or user when, for example, a wire is loose or a configuration changes. If a target configuration changes, for example, an electrician can check a smart device or application to view which devices may have to be updated.

According to some aspects, the cloud computing server 300 includes a recommendations component 316 configured to take information from the diagnostic software 302 and convert it into an easily readable recommendation for a user. The recommendations component 316 may generate drawings, diagrams, and text that can show an electrician how to fix the configuration of a programmable device.

Programmable Device

As discussed above with regard to FIG. 1 and FIG. 2, various aspects and functions described herein may be implemented as specialized hardware or software components executing in one or more programmable devices. These programmable devices are configured to independently (i.e., without instructions from a centralized control system) perform one or more specialized automated functions on a periodic basis. Programmable devices have a wide range of potential applications. The characteristics of particular types of programmable devices vary depending on the function that the programmable device is configured to perform. For instance, programmable devices configured for external use may include a rigid and insulated housing, while programmable devices configured to monitor environmental conditions may include one or more sensors configured to measure these environmental conditions. Some specific examples of programmable devices include uninterruptible power supplies, programmable logic controllers, and utility meters.

Figure 4:
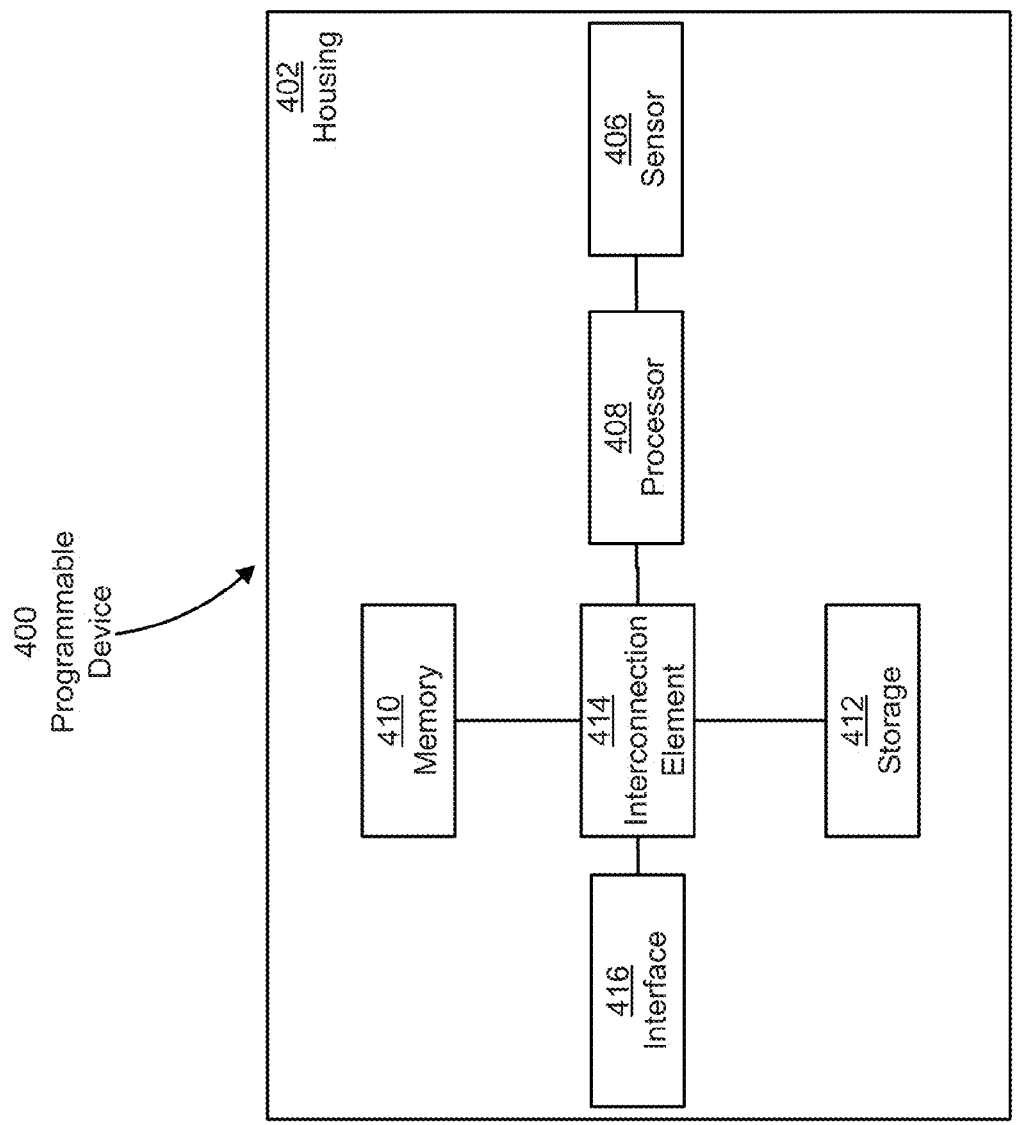
FIG. 4 is a schematic diagram of an example programmable device that executes processes and functions disclosed herein.

As shown in FIG. 4, the programmable device 400 comprises a housing 402 that includes, a sensor 406, a processor 408, a memory 410, a data storage device 412, an interconnection element 414, and an interface 416. To implement at least some of the aspects, functions, and processes disclosed herein, the processor 408 performs a series of instructions that result in manipulated data. The processor 408 may be any type of processor, multiprocessor, or controller.

The memory 410 stores programs and data during operation of the programmable device 400. Thus, the memory 410 includes any device for storing data, such as a disk drive or other nonvolatile storage device, and also typically includes a relatively high performance, volatile, random access memory such as a dynamic random access memory (DRAM) or static memory (SRAM). Various embodiments may organize the memory 410 into particularized and, in some cases, unique structures to perform the functions disclosed herein. These data structures may be sized and organized to store values for particular data and types of data.

As shown in FIG. 4, several of the components of the programmable device 400 are coupled to the interconnection element 414. The interconnection element 414 may include any communication coupling between components of the programmable device, such as one or more physical busses subscribing to one or more specialized or standard computing bus technologies such as IDE, SCSI, and PCI. The interconnection element 414 enables communications, such as data and instructions, to be exchanged between components of the programmable device 400.

The programmable device 400 also includes one or more interface devices 416 such as input devices, output devices, and combination input/output devices. Interface devices may receive input or provide output. More particularly, output devices may render information for external presentation. Input devices may accept information from external sources.

Examples of interface devices include buttons, keyboards, touch screens, network interface cards, and the like. Interface devices allow the programmable device 400 to exchange information with and to communicate with external entities, such as users and other systems. The data storage device 412 includes a computer readable and writeable nonvolatile, or non-transitory, data storage medium in which instructions are stored that define a program or other object that is executed by the processor 408. The data storage 412 also may include information that is recorded, on or in, the medium, and that is processed by the processor 408 during execution of the program. More specifically, the information may be stored in one or more data structures specifically configured to conserve storage space or increase data exchange performance. The instructions may be persistently stored as encoded signals, and the instructions may cause the processor 408 to perform any of the functions described herein. The medium may, for example, be optical disk, magnetic disk, or flash memory, among others.

As shown in FIG. 4, the sensor 406 is coupled to the processor 408. The sensor 406 includes an analog sensor and analog to digital converter to provide the processor 408 with a digital signal that represents a quantity of flow (e.g. usage) of a utility as detected by the analog sensor. The particular configuration of the sensor 406 varies depending on the utility being measured by the programmable device 400. For example, in an embodiment including a meter that measures electric, the sensor 406 includes inputs for single phase or three phase power and records periodic measurements of one or more identified characteristics (e.g., power, voltage, current, etc.) of the electric via the inputs. Upon receipt of these periodic measurements, the processor 408 stores information descriptive of the measurements and the times that the measurements were taken in the data storage element 412. Further, in some embodiments, the processor 408 subsequently transmits the stored information descriptive of the measurements to an external entity via a network interface included in the interface devices 416.

Some embodiments of the programmable device 400 include operational parameters that may be configured via protected functionality provided by the programmable device 400. These operational parameters may be used to configure CT/PT ratio, system type, demand calculations, I/O setup, onboard data logging, onboard waveform capture, and onboard alarming.

Although the programmable device 400 is shown by way of example as one type of programmable device upon which various aspects and functions may be practiced, aspects and functions are not limited to being implemented on the programmable device 400 as shown in FIG. 4. Various aspects and functions may be practiced on one or more programmable devices having a different architectures or components than that shown in FIG. 4. For instance, the programmable device 400 may include specially programmed, special-purpose hardware, such as an application-specific integrated circuit (ASIC) tailored to perform one or more particular operations disclosed herein.

In some examples, the components of the programmable device 400 disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Computer System

As discussed above with regard to FIG. 1 and FIG. 2, various aspects and functions described herein including the devices in the network may be included as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 5:
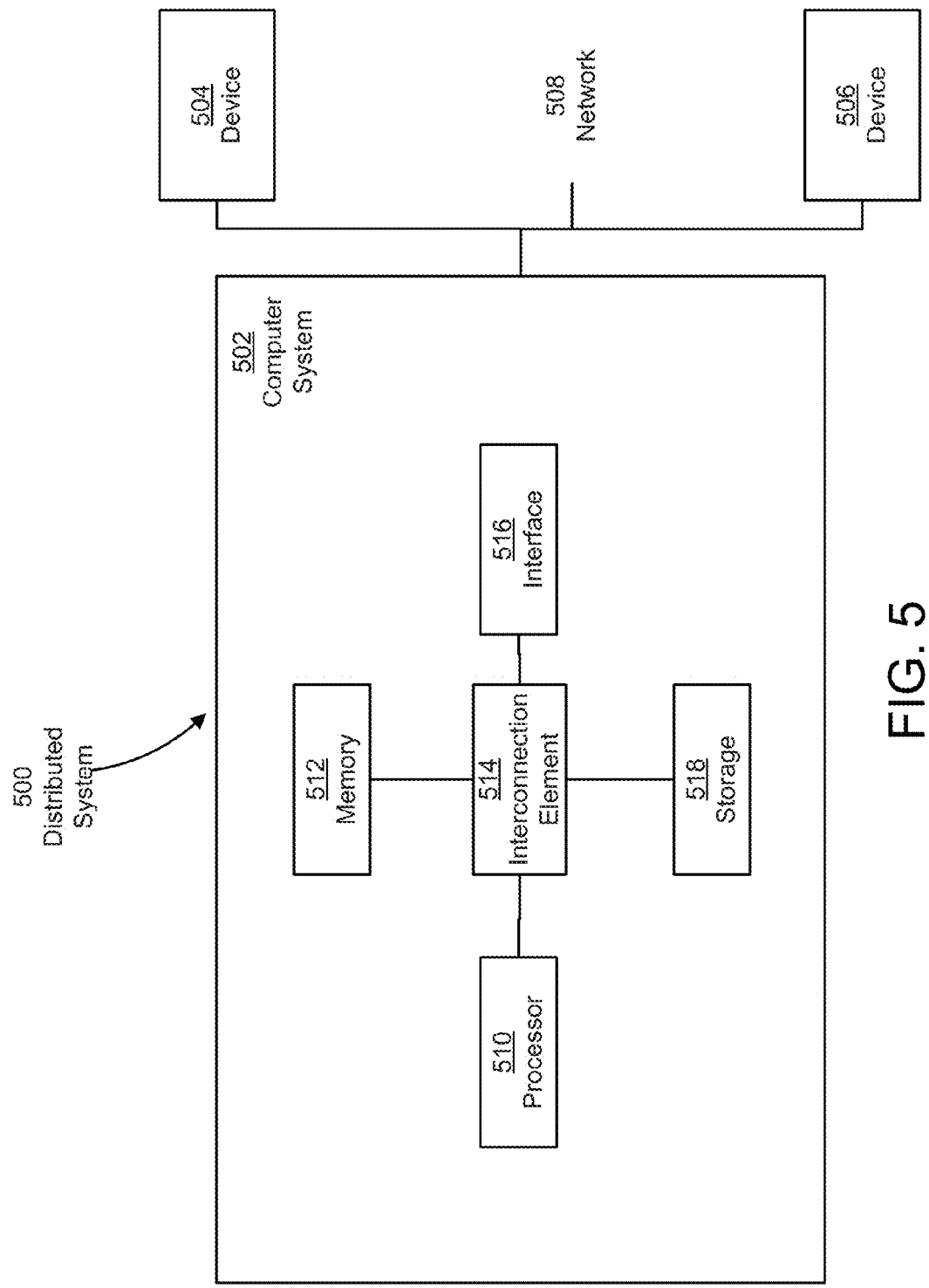
FIG. 5 is a schematic diagram of an example of a computer system that executes processes and functions disclosed herein.

Referring to FIG. 5, there is illustrated a block diagram of a distributed computer system 500, in which various aspects and functions are practiced. As shown, the distributed computer system 500 includes one or more computer systems that exchange information. More specifically, the distributed computer system 500 includes computer systems/devices 502, 504 and 506. As shown, the computer systems/devices 502, 504 and 506 are interconnected by, and may exchange data through, a communication network 508. The network 508 may include any communication network through which computer systems may exchange data. To exchange data using the network 508, the computer systems/devices 502, 504 and 506 and the network 508 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 502, 504 and 506 may transmit data via the network 508 using a variety of security measures including, for example, TLS, SSL or VPN. While the distributed computer system 500 illustrates three networked computer systems, the distributed computer system 500 is not so limited and may include any number of computer systems and computing devices, networked using any medium and communication protocol.

As illustrated in FIG. 5, the computer system 502 includes a processor 510, a memory 512, an interconnection element 514, an interface 516 and data storage element 518. To implement at least some of the aspects, functions and processes disclosed herein, the processor 510 performs a series of instructions that result in manipulated data. The processor 510 may be any type of processor, multiprocessor or controller. Some example processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 510 is connected to other system components, including one or more memory devices 512, by the interconnection element 514.

The memory 512 stores programs and data during operation of the computer system 502. Thus, the memory 512 may be a relatively high performance, volatile, random access memory such as a dynamic random access memory ("DRAM") or static memory ("SRAM"). However, the memory 512 may include any device for storing data, such as a disk drive or other nonvolatile storage device. Various examples may organize the memory 512 into particularized and, in some cases, unique structures to perform the functions disclosed herein. These data structures may be sized and organized to store values for particular data and types of data.

Components of the computer system 502 are coupled by an interconnection element such as the interconnection element 514. The interconnection element 514 may include one or more physical busses, for example, busses between components that are integrated within a same machine, but may include any communication coupling between system elements including specialized or standard computing bus technologies such as IDE, SCSI, PCI and InfiniBand. The interconnection element 514 enables communications, such as data and instructions, to be exchanged between system components of the computer system 502.

The computer system 502 also includes one or more interface devices 516 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 502 to exchange information and to communicate with external entities, such as users and other systems.

The data storage element 518 includes a computer readable and writeable nonvolatile, or non-transitory, data storage medium in which instructions are stored that define a program or other object that is executed by the processor 510. The data storage element 518 also may include information that is recorded, on or in, the medium, and that is processed by the processor 510 during execution of the program. More specifically, the information may be stored in one or more data structures specifically configured to conserve storage space or increase data exchange performance. The instructions may be persistently stored as encoded signals, and the instructions may cause the processor 510 to perform any of the functions described herein. The medium may, for example, be optical disk, magnetic disk or flash memory, among others. In operation, the processor 510 or some other controller causes data to be read from the nonvolatile recording medium into another memory, such as the memory 512, that allows for faster access to the information by the processor 510 than does the storage medium included in the data storage element 518. The memory may be located in the data storage element 518 or in the memory 512, however, the processor 510 manipulates the data within the memory, and then copies the data to the storage medium associated with the data storage element 518 after processing is completed. A variety of components may manage data movement between the storage medium and other memory elements and examples are not limited to particular data management components. Further, examples are not limited to a particular memory system or data storage system.

Although the computer system 502 is shown by way of example as one type of computer system upon which various aspects and functions may be practiced, aspects and functions are not limited to being implemented on the computer system 502 as shown in FIG. 5. Various aspects and functions may be practiced on one or more computers having a different architectures or components than that shown in FIG. 5. For instance, the computer system 502 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 502 may be a computer system including an operating system that manages at least a portion of the hardware elements included in the computer system 502. In some examples, a processor or controller, such as the processor 510, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 510 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++ or Python. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Configuration Validation Process

As described above with reference to FIG. 1 and FIG. 2, several embodiments perform processes that determine installation and configuration accuracy of a programmable device. In some embodiments, these installation verification processes are executed by a smart device, a programmable device, and a cloud computing server, as described above with reference to FIG. 1. One example of a cloud computing server is illustrated in FIG. 3 and one example of a programmable device is illustrated in FIG. 4.

Figure 6:
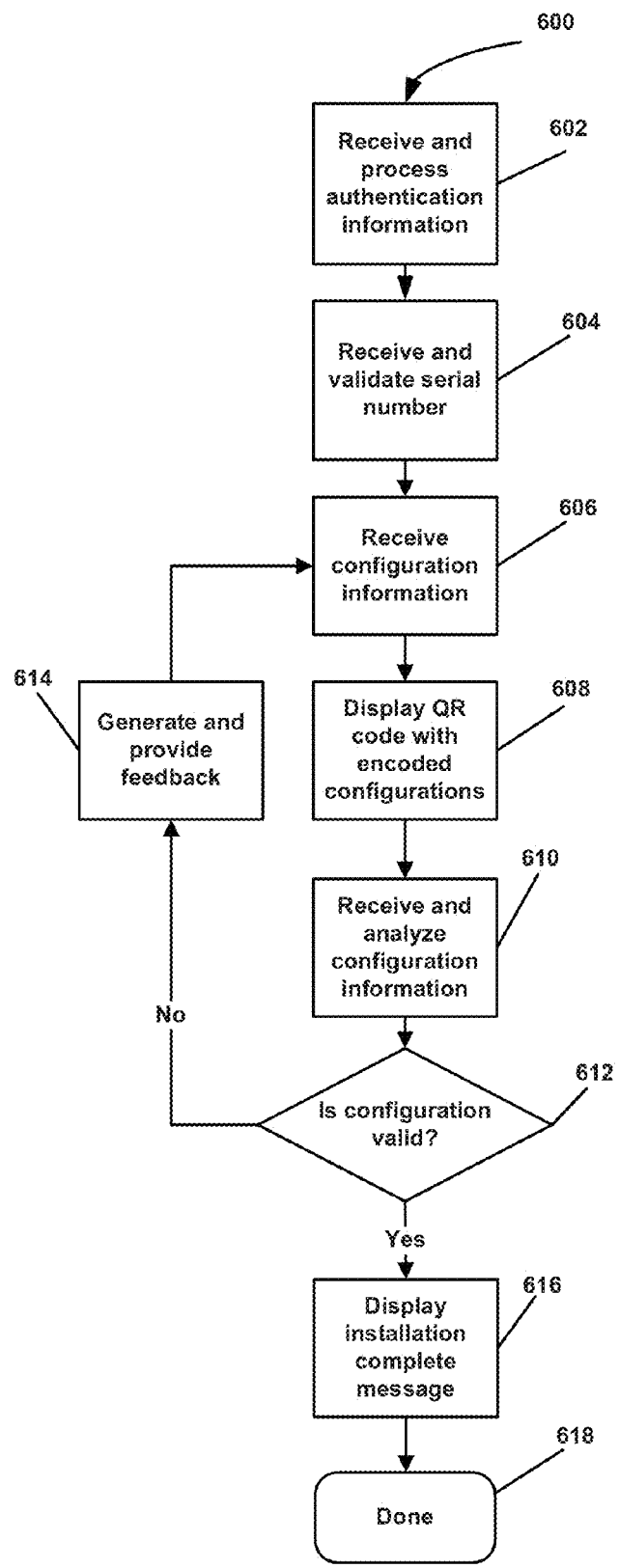
FIG. 6 is a flow diagram of an example configuration validation process, according to one embodiment.
Figure 7:
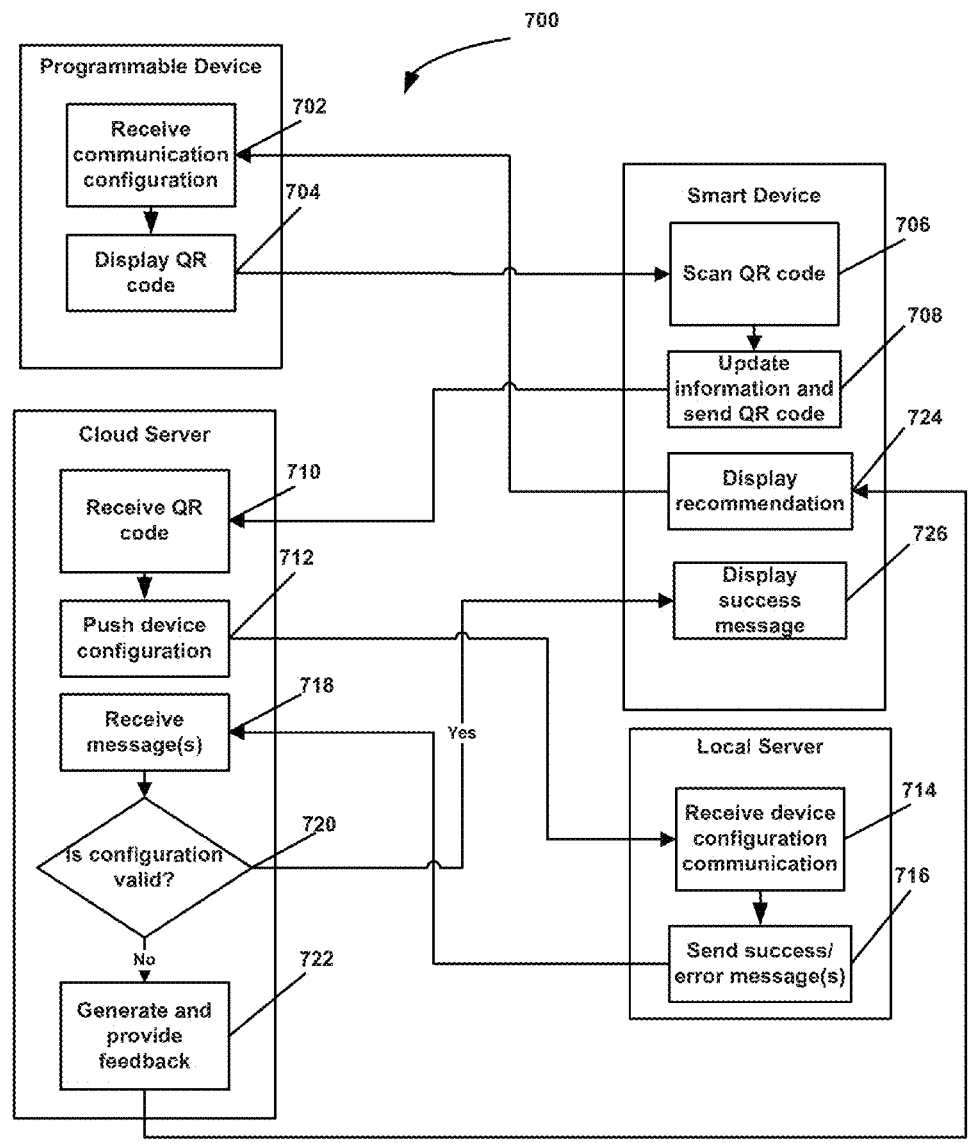
FIG. 7 is a flow diagram of an example configuration validation process including a local server, according to one embodiment.

An example process for validating an installation is illustrated in process 600 of FIG. 6. Process 600 illustrates an act of installing a new programmable device, such as the programmable device 106 described above with reference to FIG. 1. In act 602, the programmable device receives and processes authentication information from an external entity, such as the electrician 102 described above with reference to FIG. 1. According to one example, a username and password may be entered into the programmable device to start a session on the device. According to other embodiments, authenticating a user includes acts of receiving login information with a session request and providing timed access to the programmable device based on a session time. The access to the programmable device may be set at, for example, two hours so the device may automatically logout a user if the user forgets to, for example, manually log out. According to other examples, any method or no method of logging in to the programmable device may be included.

At act 604, after a user is successfully authenticated and logged in, the cloud computing server receives a serial number of a programmable device via, for example, a scan from a smart device. The serial number may be sent to the cloud computing server and a service in the cloud computing server validates the serial number, for example, with a database of serial numbers. According to some examples, the smart device that scans the serial number may be configured to directly validate the serial number. If the serial number cannot be verified, due to an invalid serial number or a connection error, a message may be displayed to an external entity (e.g., electrician 202 of FIG. 2) indicating the error. The error message may be displayed on the programmable device or on the smart device. In response to a verified serial number, the cloud computing server may send installation and configuration information and instructions to the smart device indicating how to install the programmable device. If multiple serial numbers are received, the cloud computing server may send instructions on how to install and optionally connect multiple programmable devices.

At act 606, the programmable device is installed and configured by an external entity. The configuration information may correspond to software configurations, hardware configurations, or both software and hardware configurations. The configuration information may be entered to the programmable device via an interface of the programmable device, such as interface 416 described above with reference to FIG. 4.

After the programmable device is installed and receives all of the necessary configuration information, at act 608, the programmable device collects all of the configuration information and generates a QR code that holds all of the corresponding information. In some examples, the programmable device may automatically generate the QR code. In other examples, the programmable device may navigate to a tab or section with the QR code.

At act 610, the QR code including encoded programmable device configuration information is sent to the cloud computing server. The QR code may be received by the cloud computing server from a smart device such as, for example, a mobile phone. In some examples, the programmable device may not be directly connected to the cloud computing server, and therefore may have to go through an intermediary device, such as the smart device 210 from FIG. 2. The cloud computing server may compare the configuration information with the correct installation information from, for example, a database in the cloud computing server. The cloud computing server may calculate device configuration outputs using the configuration information and compare the calculated outputs with target outputs to determine any changes to the configuration that can be done to make the programmable device more efficient. In some examples, the encoded programmable device configuration information is extracted from the QR code at the smart device and sent to the cloud computing server.

If the cloud computing server determines, at act 612, that there is an error in the configuration information that causes a mismatch between the expected configuration information and the entered configuration information, the cloud computing device may be configured to determine feedback information or a recommendation to fix the mismatch. For example, if a device's intended use information held by the cloud computing server requires that the device is left on at all times and the entered configuration includes information to sleep after a period of idle use, the cloud computing server may make a recommendation to switch the sleep configuration. In another example, if a mode is incorrect, the cloud computing server may send a mode error to the display of the smart device indicating the change that needs to be made. In a third example, the cloud computing service may use the configuration information to check for hardware issues such as wiring issues (e.g., inverted values) and base the recommendation on fixing the wires. In some examples, if multiple adjustments are necessary, the programmable device or smart device may include an error page that displays all of the errors relating to a programmable device. After the feedback is delivered, the programmable device receives updated configuration information and goes through acts 606-612 again.

Once a configuration is determined to be valid, at act 616, a message indicating an installation is complete is displayed on either the programmable device or the smart device. Process 600 ends at act 618.

According to some aspects, process 600 may be used to configure and commission secure programmable device such as, for example, revenue sealed meters. In these aspects, the cloud computing server's knowledge of locked registers, preset values from a factory, and third party information such as the information provided by the sealing house may be used to perform additional tests to ensure that the device has not been tampered with and/or to test that the device is factory locked, among other tests.

According to some examples, the configuration information may be pushed to the cloud computing server at later times to troubleshoot a device that may have been tampered with or needs to be updated. According to other aspects, additional setup testing may be installed on the programmable device to, for example, check for faulty wiring on a hardware level.

Process 700 illustrates a process flow for validating a configuration according to another aspect. The process shows a method of validating a configuration by using a local server with emulated information to test programmable devices. The local server may include correct information (e.g., IP address and other information) of the programmable device. If a cloud computing server cannot communicate with the local server's emulated programmable device, there must be an error due to, for example, a mismatch between the correct IP address in the local server and the entered IP address in the programmable device.

At act 702, the programmable device receives configuration information including, for example, communication information and information relating to parameters such as voltage, power, and current. At act 704, the programmable device displays a QR code including an embedded representation of the entered configuration information. A smart device then, at act 706, scans the QR code. At act 708, the smart device displays updated information from the QR code and and sends the QR code to a cloud computing server. In some examples, the smart device extracts the information from the QR code and sends the raw information to the cloud computing server. At act 710, the cloud computing server receives the QR code and extracts the device information from the QR code. At act 712, the cloud computing server sends the device configuration (e.g., via a push command) to the local server. At act 714, the local server receives the device configuration information. The local server, which includes correct device information, may create an emulated programmable device and attempt to communicate with the emulated device using the configuration information from the cloud computing server. If the emulated device cannot communicate, at act 716, the local server may return a message indicating a communication error and specifics about the error. The emulated device may also communicate other information relating to device groups, CT ratios, PT ratios, and power system types and compare the information from the programmable device to the correct information. The local server may then return a message indicating the results of the comparisons.

At act 718, the cloud computing server receives a message from the local server and, at act 720, determines if the configuration is valid. If the configuration information is found to be invalid, at act 722, feedback such as a recommendation indicating which problems occurred in the device configuration process may be generated and sent to the smart device. At act 724, the smart device may display the feedback information and the process goes back to act 702, wherein the programmable device receives updated configuration information. If the programmable device configuration is valid, at act 726, a message may be sent to a smart device and displayed indicating that the installation is complete and successful, ending process 700.

The processes disclosed herein each include one particular sequence of acts in a particular example. The acts included in processes may be performed by, or using, one or more programmable devices specially configured as discussed herein. Some acts are optional and, as such, may be omitted in accord with one or more embodiments. Additionally, the order of acts can be altered, or other acts can be added, without departing from the scope of the systems and methods discussed herein. In addition, as discussed above, in at least one embodiment, the acts are performed on a particular, specially configured machine, namely a programmable device configured according to the examples disclosed herein.

Figure 8:
FIGS. 8 and 9 are example smart device screens displaying errors, according to one embodiment.
Figure 9:
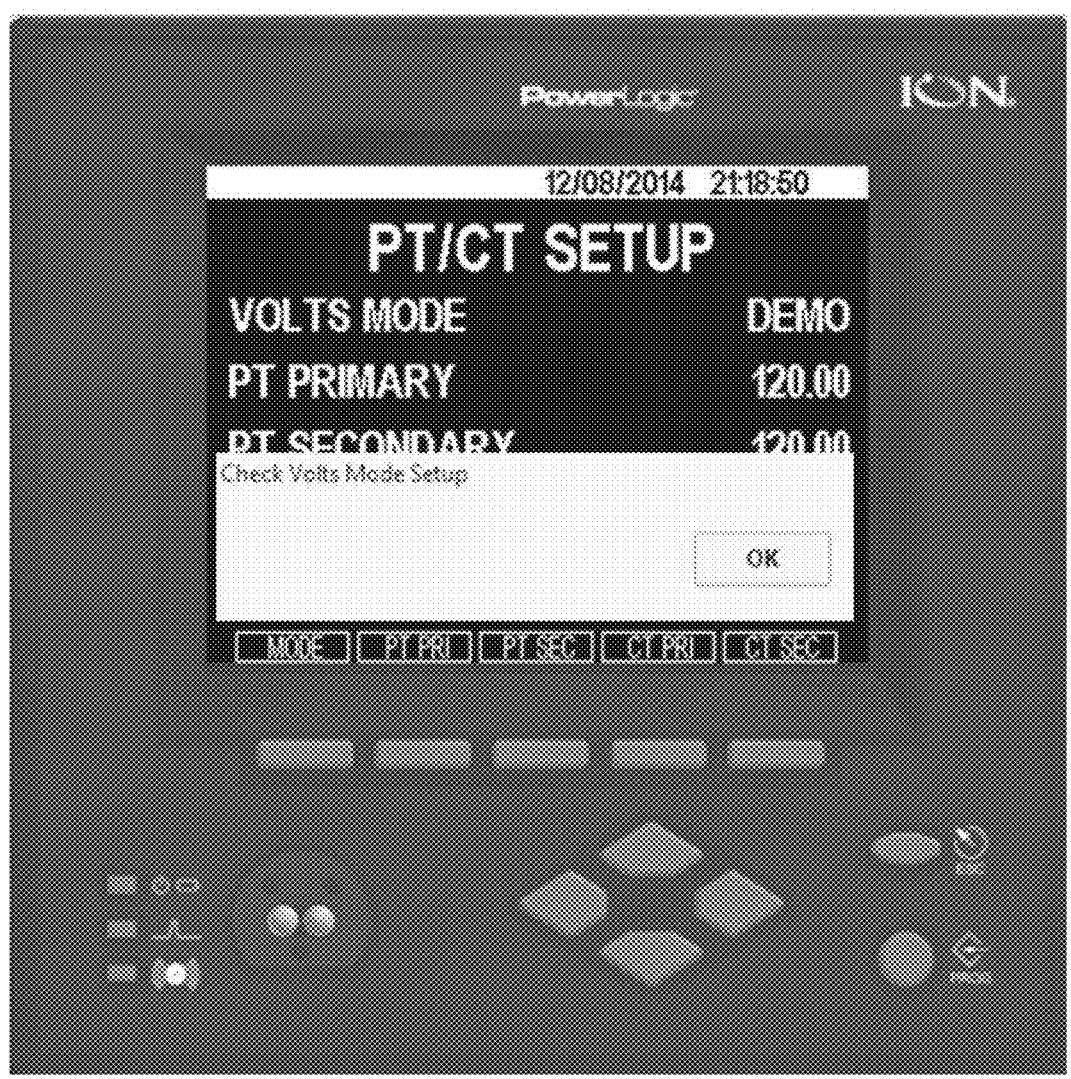

FIG. 8 and FIG. 9 illustrate a smart device with multiple screens and device information. The display may include tabs or sections including IP address information, subnet information, gateway information, a device mode, device families, QR code scanning information, and other information. The smart device may receive and update the information from a scanned QR code of the programmable device. The smart device may include various control and navigation options.

FIG. 8 shows a communication failure that may occur as a result of, for example, an IP address being entered wrongly into a programmable device. The communication failure may display more accurate information such as what to specifically change. The information may be sent from the cloud computing server based on known configurations and previously setup programmable devices. FIG. 9 shows a "Check Volts Mode Setup" error, which may occur if the voltage entered to a device or a group of devices is wrong (e.g., two devices with different voltage requirements were mixed up and configured wrongly).

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the scope of the examples discussed herein. Accordingly, the foregoing description and drawings are by way of example only.

What is claimed is:

1. A system comprising:
   at least one programmable device, the programmable device being configured to:
   generate configuration information,
   encode the configuration information into a QR code, and
   display the QR code with the encoded configuration information;
   a server including:
   a first memory, and
   at least a first processor coupled to the first memory and configured to:
   receive the configuration information encoded in the QR code, the configuration information being based on one or more values of one or more configuration options for the at least one programmable device, wherein the programmable device is an uninterruptible power supply, a programmable logic controller, or a utility meter; and
   a local server comprising:
   a second memory including target configuration information relating to a plurality of programmable devices, and
   at least a second processor configured to:
   emulate the at least one programmable device using the target configuration information,
   receive the configuration information encoded in the QR code,
   detect whether the configuration information is in accord with the target configuration information, and
   send a message to the server indicating whether the configuration information is in accord with the target configuration information; and
   wherein the at least a first processor of the server is further configured to:
   generate a recommendation to provide a user with information to update the programmable device in response to determining that the configuration information is not in accord with the target configuration information, the information including one or more drawings, diagrams, or text that instruct the user to fix a configuration of the programmable device,
   send the recommendation to a smart device, and
   transmit a message indicating whether the configuration information is in accord with the target configuration information.

2. The system according to claim 1, wherein the server includes a device list of programmable devices, the list including a serial number of the at least one programmable device, configuration parameters of the at least one programmable device, and an intended usage of the at least one programmable device.

3. The system according to claim 1, wherein the server includes third party information relating to locked registers of the at least one programmable device and factory values of the at least one programmable device.

4. The system according to claim 1, wherein the server is not directly connected to the at least one programmable device.

5. The system according to claim 1, wherein the system further comprises the smart device, the smart device being configured to:
   scan the QR code;
   send the QR code to the server;
   receive the recommendation; and
   display the one or more drawings, diagrams, or text.

6. The system according to claim 1, wherein the server is further configured to generate configuration instructions to configure the at least one programmable device.

7. The system according to claim 1, wherein the server includes diagnostic software to determine the target configuration information.

8. The system according to claim 1, wherein the at least a first processor of the server is further configured to:
   receive a serial number of the at least one programmable device; and
   generate installation instructions for the at least one programmable device.

9. A system comprising:
   at least one programmable device including:
   a first memory; and
   at least a first processor coupled to the first memory and configured to:
   generate configuration information, the configuration information based on one or more values of one or more configuration options,
   encode the configuration information into a QR code,
   display the QR code including a representation of the configuration information;
   a server comprising:
   a second memory, and
   at least a second processor coupled to the second memory and configured to:
   receive the configuration information encoded in the QR code, and
   generate a recommendation to provide a user with information to update the at least one programmable device; and
   a local server comprising:
   a third memory including target configuration information relating to a plurality of programmable devices, and
   at least a third processor configured to:
   emulate the at least one programmable device using the target configuration information,
   receive the configuration information encoded in the QR code;

detect whether the configuration information is in accord with the target configuration information, and send a message to the server indicating whether the configuration information is in accord with the target configuration information; and wherein the at least a first processor of the at least one programmable device is further configured to:

receive an update, from a smart device, based on the recommendation for the user, the recommendation being generated at the server in response to determining that the configuration information is not in accord with target configuration information, wherein the recommendation provides information including one or more drawings, diagrams, or text that instruct the user to fix a configuration of the at least one programmable device, and wherein the at least one programmable device is an uninterruptible power supply, a programmable logic controller, or a utility meter.

10. The system according to claim 9, further comprising the smart device, the smart device configured to:

scan the QR code;

update information relating to the at least one programmable device using the QR code;

send the QR code to the server;

receive the recommendation; and display the one or more drawings, diagrams, or text.

11. The system according to claim 10, wherein the at least one programmable device is not directly connected to the server.

12. A method for verifying a configuration, the method comprising acts of:

generating configuration information;

encoding, by at least one programmable device, the configuration information into a QR code;

displaying, on a display of the at least one programmable device, the QR code including the encoded configuration information;

receiving the configuration information encoded in the QR code at a server, the configuration information based on one or more values of one or more configuration options for the at least one-programmable device, wherein the at least one programmable device is an uninterruptible power supply, a programmable logic controller, or a utility meter;

emulating the at least one programmable device using target configuration information relating to a plurality of programmable devices;

receiving the configuration information encoded in the QR code at a local server;

detecting whether the configuration information is in accord with the target configuration information;

sending a message from the local server to the server indicating whether the configuration information is in accord with the target configuration information;

generating a recommendation to provide a user with information to update the at least one programmable device in response to determining that the configuration information is not in accord with the target configuration information, the information including one or more drawings, diagrams, or text that instruct the user to fix a configuration of the at least one programmable device;

sending the recommendation to a smart device;

displaying, by the smart device, the one or more drawings, diagrams, or text; and transmitting a message indicating whether the configuration information is in accord with the target configuration information.

13. The method according to claim 12, further comprising acts of:

scanning, by a smart device, the QR code; and sending, by the smart device, the configuration information.

14. The method according to claim 12, further comprising acts of:

scanning, by the smart device, a serial number of the at least one programmable device;

sending, by the smart device, the serial number to the server;

generating, by the server, instructions for installing the at least one programmable device; and sending, by the server to the smart device, the instructions.

15. The method according to claim 12, wherein detecting whether the configuration information is in accord with the target configuration information includes pushing the configuration information to a virtualized programmable device.

* * * * *